May 6, 1924.
E. A. HAVENS
RESILIENT WHEEL
Filed Oct. 28, 1922
1,493,198
3 Sheets-Sheet 1
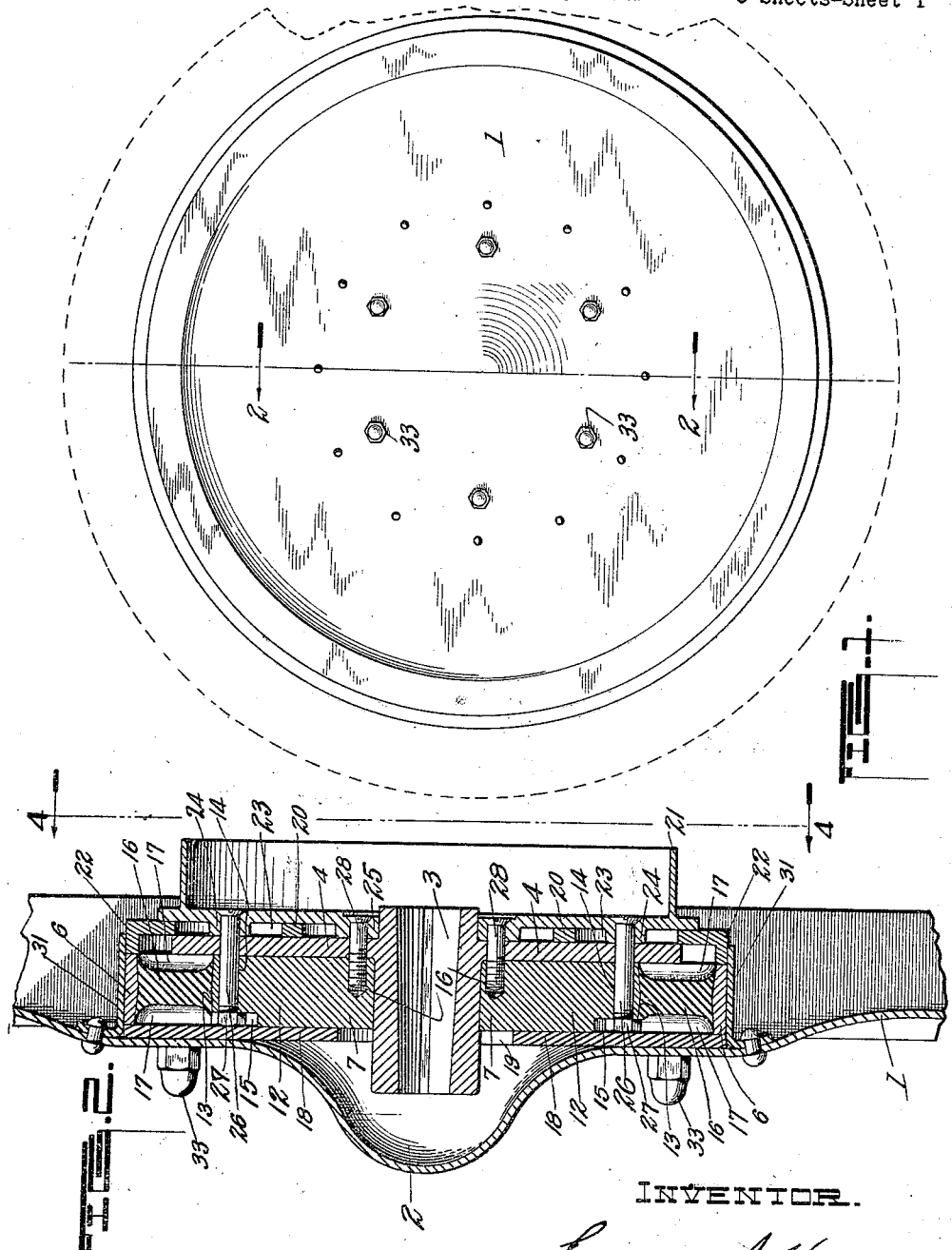
INVENTOR.

May 6, 1924.
E. A. HAVENS
1,493,198
RESILIENT WHEEL
Filed Oct. 28, 1922  3 Sheets-Sheet 2
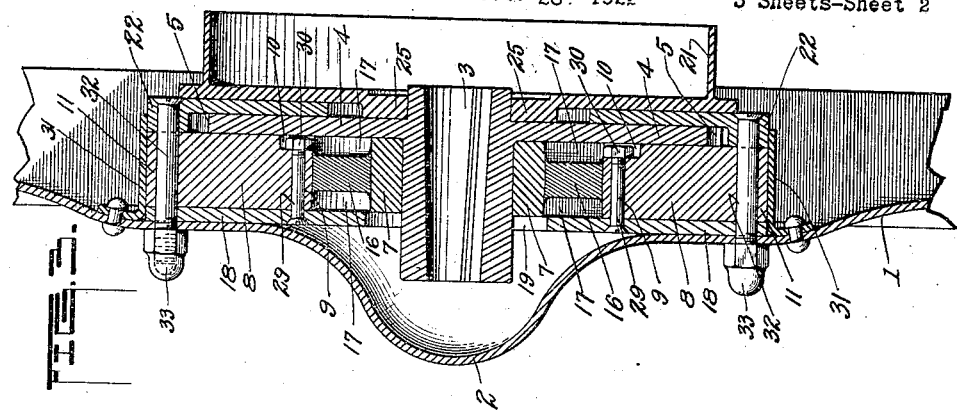
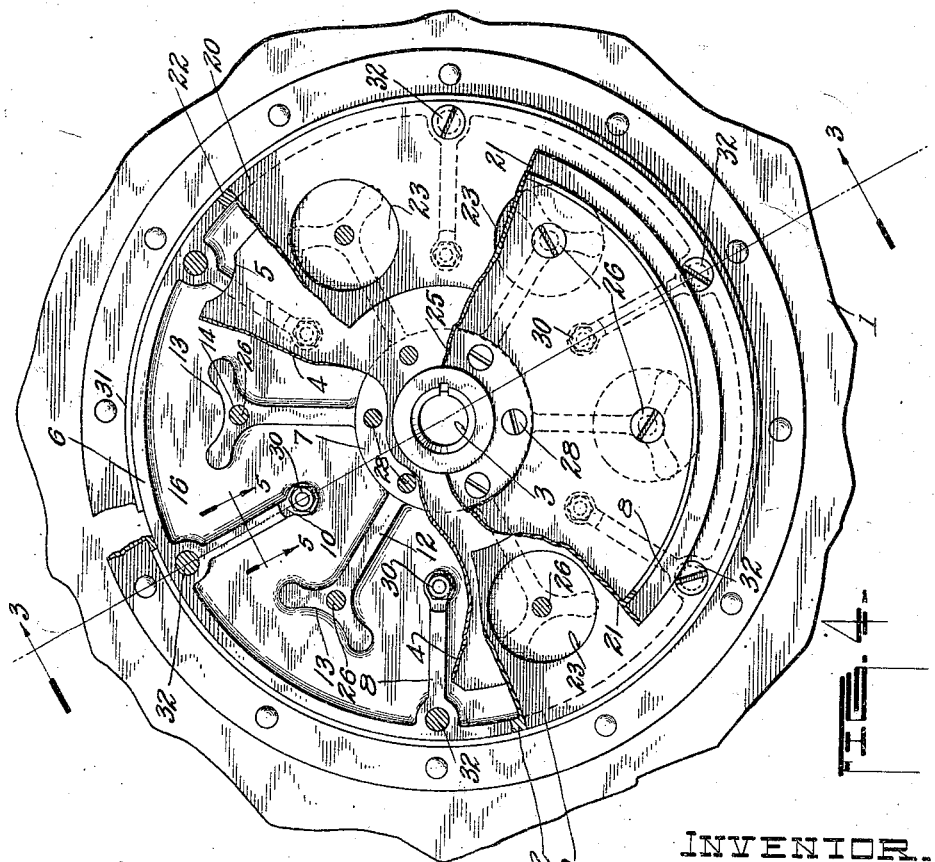
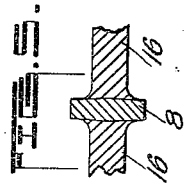
INVENTOR.
Ernest A. Havens
Atty.

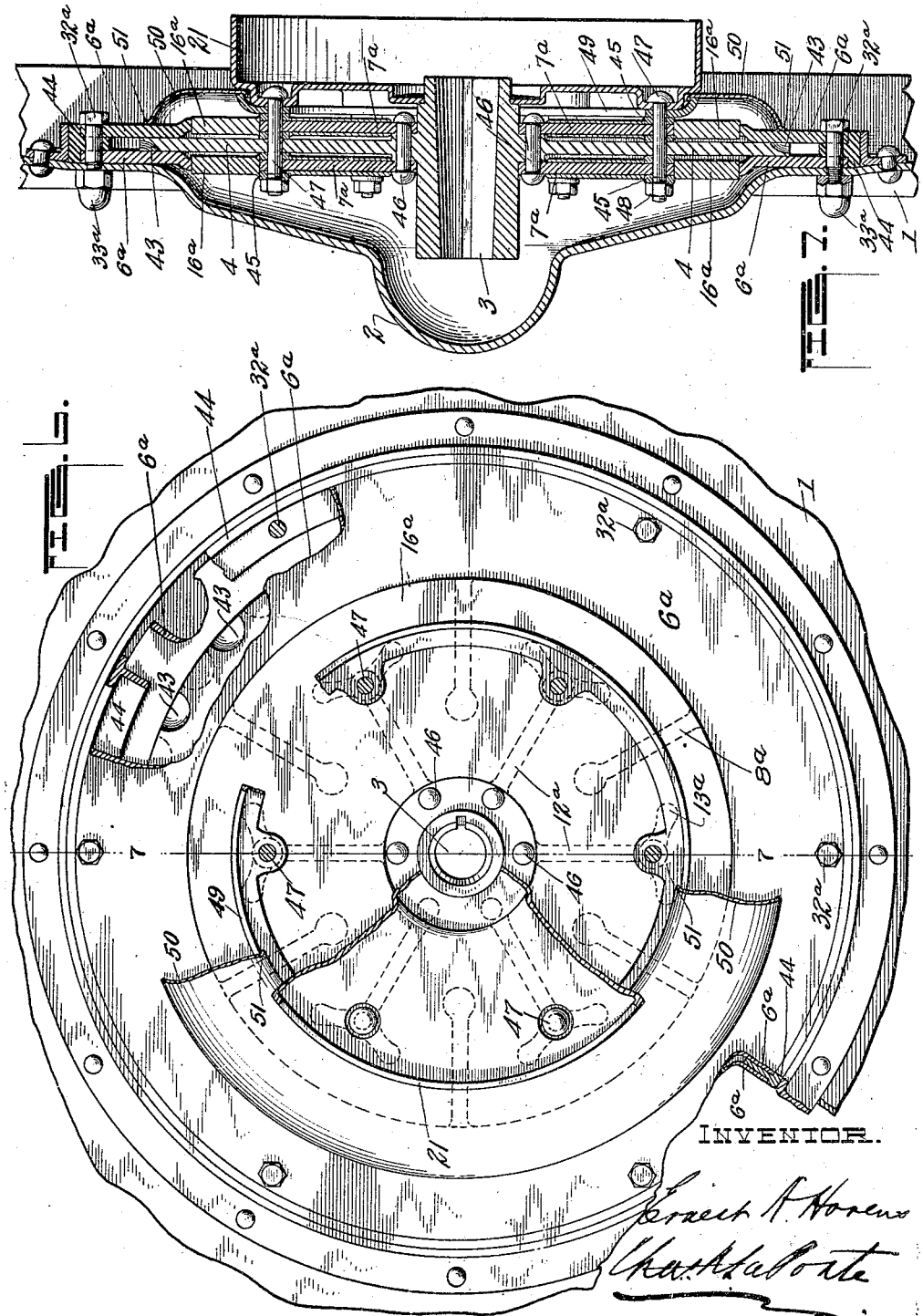

Patented May 6, 1924.

1,493,198

UNITED STATES PATENT OFFICE.

ERNEST A. HAVENS, OF PEORIA, ILLINOIS, ASSIGNOR OF ONE-FOURTH TO FRANK P. CASEY, ONE-FOURTH TO HERMAN H. ASHENBERG, BOTH OF PEORIA, ILLINOIS, AND ONE-FOURTH TO NORMAN T. NICHOLS, OF NEW CANTON, ILLINOIS.

RESILIENT WHEEL.

Application filed October 28, 1922. Serial No. 597,529.

*To all whom it may concern:*

Be it known that I, ERNEST A. HAVENS, a citizen of the United States, a resident of Peoria, in the county of Peoria and State of Illinois, have invented new and useful Improvements in Resilient Wheels, of which the following is a specification.

This invention has reference to wheels and it has for its principal object to improve the construction of wheels used on automobiles and trucks.

The invention has for a further object to provide a resilient wheel preferably of the pressed steel disc type, using a solid rubber tire or a pneumatic tire.

A further object of the invention is to provide a hub structure for a resilient wheel, wherein the hub structure has a suspended connection with the tire supporting element of the wheel, such connection preferably comprising india-rubber vulcanized to elements included in the hub structure and the tire supporting element.

A still further object of the invention is an improved hub structure for wheels, which comprises a hub for securement to an axle, and two annular concentric parts or rings, each having a plurality of spaced radially disposed fingers; the fingers of one part or ring arranged alternately to the other part or ring, so that they present a staggered relation to each other; and an interposed flexible or elastic element such as india-rubber vulcanized to the surfaces of said parts or rings and also to the respective fingers of such parts; means being provided for assembling such hub structure in or attaching the same to a wheel structure to which may be connected a solid or pneumatic tire.

That the invention may be more fully understood, reference is had to the accompanying drawings forming a part of the present description, illustrating a preferred embodiment of the invention, in which:—

Figure 1 is a greatly reduced side elevation of a wheel embodying my invention, the same being preferably of the pressed steel disc type, a pneumatic tire being shown in dotted lines;

Figure 2 is a detail in section, as the same would appear, if taken on the line 2—2 Figure 1;

Figure 3 is a detail in section, somewhat similar to Figure 2, except that it is taken on the line 3—3 Figure 4;

Figure 4 is a side elevation, parts broken away and parts being in section, looking at the brake-drum side of Figure 3;

Figure 5 is a sectional detail as the same would appear if taken on the line 5—5 Figure 4;

Figure 6 is a detail side elevation, parts broken away and parts in section, showing a modified structure;

Figure 7 is a detail cross-section, as the same would appear if taken on the line 7—7 Figure 6;

Like characters of reference denote corresponding parts throughout the figures.

Referring to Figures 1 to 5, both inclusive, a pressed steel wheel 1 of the disc type is shown and such wheel may be constructed to carry a solid rubber tire or a pneumatic tire, which ever may seem more desirable. The body of the wheel 1 may have any suitable contour, formed by pressing or stamping, but I prefer that the center of the wheel shall be stamped or pressed with the central outwardly bulging portion 2 designed as a housing for the hub structure.

The hub structure preferably includes the hub member 3 designed to be attached to the end of an axle, not shown, and said hub, at or near its inner end has connected thereto the annular plate or flange 4 the peripheral edge of which, at intervals, is provided with notches, seats or depressions 5, see Figures 3 and 4.

There are provided two annular concentric parts or rings 6 and 7, the latter being carried by and slipped over the outer end of the hub member 3 and preferably held in juxtaposition to the plate or flange 4 of the hub and the former is spaced therefrom and connected thereto as will be explained. The part or ring 6 is provided with a plurality of spaced inwardly extending and radially disposed fingers 8 which terminate short of the part or ring 7 and such fingers at their inner ends are provided with bolt receiving openings 9 and countersunk seats 10, see Figure 3, and at the juncture of the said fingers with the ring 6 other bolt receiving openings 11 are provided. The part or ring 7 is provided with a plurality of spaced outwardly extending and radially disposed fingers 12 which terminate short of the part or ring 6 and the outer end of each finger 12 is formed or provided with the flared or substantially bifurcated end 13 and with a bolt opening 14 therethrough and a counter-sunk seat 15; the part or ring 7 itself being also provided with bolt receiving openings 16. The parts or rings 6 and 7 are assembled so that the respective fingers have an alternate arrangement and present a staggered arrangement somewhat as shown in Figure 4 with the fingers 8 lying in the spaces between the fingers 12, and said fingers 12 lying in the spaces between the fingers 8. The part or ring 7 is preferably connected to and suspended from the part or ring 6 by means of an elastic or flexible means such as india-rubber 16 which is vulcanized to the periphery of the part or ring 7 and to the inner surface of the part or ring 6 and also to the ends and opposite edges of the fingers 8 and 12, within and around the edges of the flared or substantially bifurcated ends of the fingers 13 and covering the entire area between the parts or rings 6 and 7 and the alternately spaced fingers 8 and 12 of said respective parts or rings I prefer that the rubber 16 shall be of a thickness less than the width of the parts or rings 6 and 7 and the fingers 8 and 12, as shown in Figures 2 and 3 providing corresponding spaces or pockets 17 on either side of the rubber for a lubricating means, preferably graphite, not shown. The spaces or pockets 17 on one side of the rubber are walled by the rubber and the plate or flange 4 of the hub 3 and on the other side by the rubber and a plate 18 which has an opening 19 to permit said plate to be slipped over the outer end of the hub 3 and brought into juxtaposition to the outer faces of the parts or rings 6 and 7 and the fingers 8 and 12, see Figures 2 and 3. The hub structure is completed by a flanged plate 20 and a brake-drum 21. The flanged plate 20 lies next adjacent the exposed face of the plate or flange 4 of the hub, with its flanged end 22 overlying and spaced from the peripheral edge of the flange or plate 4 and engaging the part or ring 6, see Figures 2 and 3 and the body of said flanged plate 20 is provided with a plurality of spaced openings 23 receiving bosses 24 on the brake-drum 21 which bear against the flange or plate 4 of the hub, and said brake-drum has a hub 25 fitting over the inner end of the hub 3. Bolts 26 with heads counter-sunk in the brake-drum pass through the bosses 24 of said brake-drum, through the flange or plate 4 of the hub and through the openings 14 in the part 6 and are engaged by nuts 27 held within the seats 15. Counter-sunk screws 28 pass through the hub of the brake-drum, through the flange or plate of the hub and engage threads in the openings 16′ in the part 7. These securing means are best seen in Figure 2. Other securing means, best seen in Figure 3 include counter-sunk bolts 29 passing through the plate 18 and the openings 9 in the part 6 and engaged by nuts 30 held within the seats 10. Such securing means, including the bolts 26, screws 28 and the bolts 27 serve to secure the elements 3, 4, 6, 7, 17, 20 and 21 in assembled relation as best seen in Figures 2 and 3, and when such hub structure is connected to the wheel 1 the same is held within a drum 31 riveted or otherwise suitably secured to the inside of said wheel, being adapted, as shown to center the hub structure on the wheel, the outer end of the hub 3 projecting within the bulging portion 2 of the wheel with sufficient space left for the securement of a nut or equivalent means, not shown, on the axle, not shown, to which the hub 3 is connected. Bolts 32 connect the hub structure to the wheel, the same being passed through the flanged end of the plate 20 and counter-sunk therein and through the openings 11 in the part 6 and through the wheel 1, see Figure 3 and held by the nuts 33, which, when removed permit the wheel to be removed from and to release the hub structure to permit access to be had thereto, as will be understood.

In the structure just described protection is afforded the rubber resilient member by the flange or plate 4 of the hub 3, on one side and the plate 17 on the other side and the spaces or pockets 17 therebetween and on either side of the rubber give ample provision for spreading of the rubber when under compression and the graphite lubricant working its way between the adjacent faces of the parts or rings 6 and 7 and the plate 17 and between the parts or rings 6 and 7 and the flange or plate 4 of the hub and between the flange or plate 4 and the flanged plate 20 presents well lubricated surfaces to permit a noiseless and free movement of the parts, one on the other. When the wheel is subjected to a sudden jar the parts 6 and 7 have a movement relative to each other to compress or stretch the elastic medium 16, the same accommodating itself in the direction of or reverse to that of the strain applied, the flared or substantial bifurcated ends of the fingers 12 having a substantial purchase on or in the elastic medium and designed to uniformly compress or stretch the elastic medium throughout the area of such compression or stretching. The consistency of the elastic medium should be such as to give limited play to the parts, as I have experienced that very little movement need be had to accomplish the most desirable results, and grinding or churning of the elastic medium is thereby eliminated. A further advantage this structure has, is in relieving the shock and rebound due to the application of the motive power to the wheels and when stopping and applying the brakes. When power is applied to the axle and hub 3 the elastic medium will yield so that the power may be converted therethrough to the wheel thus relieving the jerk on starting, and when stopping and applying the brakes the reverse of such action takes place thus relieving the jar incident to such action. The opening 19 in the plate 18 will permit relative movement between said plate and the hub 3 extending through such opening. Likewise the openings 23 in the flanged plate 20 will permit relative movement between said plate and the brake-drum 21, the hub of which is carried within the plate and the bosses of which pass through the openings in said plate. Also the notches, seats or depressions 5 in the periphery of the flange or plate 4 of the hub are placed coincidental with the bolts 32 and permit relative movement between said plate and the flanged portion of the plate 20 through which said bolts are carried. Thus ample provision is made for relative movement of certain elements of the hub structure, one on the other due to jar or strain, whatever its character, on the wheel.

I am aware that the use of an elastic medium in a hub structure is not new, but I am not aware of the use of such a medium being employed for the suspension of certain parts of the hub structure from certain other parts of such hub structure and where the elastic medium, being india-rubber, is vulcanized to such hub parts. Such an arrangement and construction lends a resiliency to wheels not heretofore attained and will permit of the use of solid tires with equally as good results as pneumatic tires, but the use of the latter may be continued wherever and whenever it is desirable.

In Figures 6 and 7 I have shown a modification of the invention disclosed in Figures 1 to 5 both inclusive, wherein, instead of two annular concentric parts or rings, such as 6 and 7 I have shown such parts arranged in pairs and in parallel spaced relation, necessitating two elastic mediums instead of one, as indicated at 16. No material change is made in the wheel structure 1, or the brake-drum 21 and the hub 3 and flange or plate 4 are substantially the same, except that the flange or plate 4 of the hub is removed farther from the inner end of the hub 3 and the edge of the flange or plate 4 is provided with a plurality of alternately disposed recesses 43 on opposite faces of said flange or plate 4, serving as feeding grooves for the lubricant graphite that the same may have passage between the flange or plate and adjacent plate members and elastic medium on either side of said flange or plate 4 for a proper lubrication of the parts and facilitate the noiseless and easy movements of the parts one on the other due to strain or shock from whatever cause. The drum 31 may be of less width than previously shown, as the pairs of annular concentric parts or rings $6^a$, $6^a$ and $7^a$, $7^a$ and india-rubber filling $16^a$, $16^a$ vulcanized thereto and between the respective parts or rings are of less width than corresponding parts or elements previously described. In this structure instead of the flanged plate 20 an annular ring 44 T shape in cross-section is provided to which is bolted a pair of spaced parts or rings $6^a$, $6^a$ one on either side of the flange or plate 4, and to such parts are vulcanized the rubber filling $16^a$, in turn vulcanized to the parts or rings $7^a$, $7^a$, also disposed on either side of the flange or plate 4 of the hub. I also prefer that the rubber filling in this instance shall incase the fingers $8^a$ and $12^a$ of the respective inner and outer parts or rings $6^a$ and $7^a$, with the exception of spacing washers 45 on the ends of the flared ends $13^a$ of the fingers $12^a$ which are used to properly space the fingers from the flange or plate 4 and provide a suitable bearing for securing bolts. The inner parts or rings $6^a$ are secured to the flange or plate 4 by means of rivets 46 or other suitable securing means passing through said parts or rings $6^a$ and said flange or plate 4 of the hub, and the parts or rings $7^a$ are connected by bolts $32^a$ to the ring 44 and to the wheel 1 and said bolts engaged by nuts $33^a$ providing a detachable connection for the hub unit to the wheel in a manner similar to that previously described. The brake-drum 21 is secured to the flange or plate 4 and the flared ends of the fingers $12^a$ are secured to said flange or plate 4 of the hub by means of bolts 47 passing therethrough and secured in place by nuts 48. A spacing ring 49 is interposed between the brake-drum and the next adjacent parts $6^a$ and $7^a$ and elastic medium connecting the same and said ring secures between it and the brake-drum, the inner edge of a dirt protecting plate 50 which extends outwardly and inwardly toward the next adjacent part or ring $6^a$ and has a protecting edge 51 bearing against the part or ring $6^a$ to prevent dirt working its way to the elastic medium.

The last mentioned structure is not unlike the first described, except that instead of the one set of annular concentric parts or rings and interposed vulcanized rubber, two sets of such parts are provided and the same so housed or encased in the hub structure as to avoid the use of certain previously referred to elements. The action of the structure shown in Figures 6 and 7 is not unlike that first described, as will be readily understood.

It is obvious from the foregoing description that the invention may be modified in form as well as structure without departing from its spirit and scope, and I therefore do not wish to be limited to precise details except as provided by the appended claims.

What I claim is:—

1. In a wheel of the character described, in combination, a hub structure including a pair of concentric rings provided with alternately arranged radially disposed fingers, an elastic medium disposed within and between said rings and vulcanized thereto, whereby the inner ring is suspended from the outer ring, and an axle receiving hub independent of said rings.

2. In a wheel of the character described, in combination, a hub structure including a pair of concentric rings provided with alternately arranged radially disposed fingers, an elastic medium disposed within and between said rings and vulcanized thereto, whereby the inner ring is suspended from the outer ring, an axle receiving hub independent of said rings and adapted to be inserted within the inner ring, said hub having a plate connected thereto to provide a retaining member for one side of said hub structure, a retaining plate member for the opposite side of said hub structure, and means for assembling the elements of said structure and securing the same to a wheel.

3. In a wheel of the character described, in combination, a hub structure including a pair of concentric rings provided with alternately arranged radially disposed fingers, an elastic medium disposed within and between said rings and vulcanized thereto, whereby the inner ring is suspended from the outer ring, an axle receiving hub independent of said rings and adapted to be inserted within the inner ring, said hub having a plate connected thereto to provide a retaining member for one side of said hub structure, a retaining plate member for the opposite side of said hub structure, a third plate disposed next adjacent said hub plate and having a flange overlying the peripheral edge of said hub plate and extending to the outer ring, and means for assembling the elements of said structure and securing the same to a wheel.

4. In a wheel of the character described, in combination, a pair of concentric rings provided with alternately arranged radially disposed fingers, an elastic medium of less width than said rings disposed therebetween and vulcanized thereto, whereby the inner ring is suspended from the outer ring, an axle hub fitting within said inner ring, plates lying next adjacent and on either side of said rings and together with said elastic medium forming lubricating pockets therebetween, and means for assembling said elements on a wheel.

5. In a wheel of the character described, in combination, a pair of concentric rings provided with alternately arranged radially disposed fingers, an elastic medium of less width than said rings disposed therebetween and vulcanized thereto, whereby the inner ring is suspended from the outer ring, an axle hub fitting within said inner ring, plates lying next adjacent and on either side of said rings and together with said elastic medium forming lubricating pockets therebetween, one of said plates connected with said hub, a plate disposed next adjacent said hub plate and having a flange overlying said hub plate and extending to the outer ring, means for assembling said elements and attaching the same to a wheel structure.

6. In a wheel of the character described, in combination, a wheel structure, a centering drum connected thereto, a hub structure for said wheel adapted to fit within said drum including a pair of concentric rings, an elastic medium disposed within and between said rings and vulcanized thereto, whereby the inner ring is suspended from the outer ring, an axle hub independent of and fitting within said inner ring, plates lying next adjacent and on either side of said rings, and means for assembling the elements of said hub structure and securing the same to said wheel structure within said drum.

7. In a wheel of the character described, in combination, a wheel structure, a centering drum connected thereto, a hub structure for said wheel adapted to fit within said drum including a pair of concentric rings provided with alternately arranged and overlapping radially disposed fingers, an elastic medium disposed within and between said rings and vulcanized thereto, whereby the inner ring is suspended from the outer ring, an axle hub independent of and fitting within said inner ring, plates lying next adjacent and on either side of said rings, and means for assembling the elements of said hub structure and securing the same to said wheel structure within said drum.

8. In a wheel of the character referred to, in combination, a pair of concentric rings provided with alternately arranged radially disposed fingers, the fingers of one ring having flared ends, an elastic medium of less width than said rings disposed therebetween and vulcanized thereto, whereby the inner ring is suspended from the outer ring, an axle hub fitting within said inner ring, plates lying next adjacent and on either side of said rings and together with said elastic medium forming lubricating pockets therebetween, and means for assembling said elements on a wheel to permit relative movement of said plates and elastic medium.

9. In a wheel in combination, a pressed steel wheel of the disc type having a central bulging portion, a centering drum connected to the inner face of said disc, a hub structure adapted to fit within said drum comprising a pair of concentric rings, an elastic medium disposed within and between said rings and vulcanized thereto, whereby the inner ring is suspended from the outer ring, an axle hub independent of said rings adapted to fit within said inner ring and extend into the bulging portion of said disc, plates lying next adjacent and on either side of said rings, a plate disposed next adjacent one of said plates and having a flange overlying said plate and extending inwardly to the outer ring, means to connect one of said plates and one of said rings, and other means to connect said flanged plate, the other of said rings and said disc.

10. In a wheel, in combination, a pressed steel wheel of the disc type having a central bulging portion, a centering drum connected to the inner face of said disc, a hub structure adapted to fit within said drum comprising a pair of concentric rings provided with alternately arranged and overlapping radially disposed fingers, the fingers of one ring having flared ends, an elastic medium disposed within and between said rings and vulcanized thereto, whereby the inner ring is suspended from the outer ring, an axle hub independent of said rings adapted to fit within said inner ring and extend into the bulging portion of said disc, plates lying next adjacent and on either side of said rings, a plate disposed next adjacent one of said plates and having a flange overlying said plate and extending inwardly to the outer ring, means to connect one of said plates and one of said rings, and other means to connect said flanged plate, the other of said rings and said disc.

In witness whereof I have hereunto affixed my hand this 26th day of October, 1922.

ERNEST A. HAVENS.